United States Patent
Iizuka

(10) Patent No.: US 8,137,865 B2
(45) Date of Patent: Mar. 20, 2012

(54) PLATE MEMBER FOR FUEL CELL, MANUFACTURING METHOD OF THE PLATE MEMBER, AND FUEL CELL

(75) Inventor: Kazutaka Iizuka, Nisshin (JP)

(73) Assignee: Toyota Jidosha Kabshiki Kaisha, Toyota-shi (JP)

( * ) Notice: Subject to any disclaimer, the term of this patent is extended or adjusted under 35 U.S.C. 154(b) by 598 days.

(21) Appl. No.: 12/280,100

(22) PCT Filed: Aug. 30, 2007

(86) PCT No.: PCT/JP2007/067342
§ 371 (c)(1),
(2), (4) Date: Aug. 20, 2008

(87) PCT Pub. No.: WO2008/041443
PCT Pub. Date: Apr. 10, 2008

(65) Prior Publication Data
US 2010/0227246 A1    Sep. 9, 2010

(30) Foreign Application Priority Data
Sep. 29, 2006    (JP) .................... 2006-267962

(51) Int. Cl.
*H01M 8/04* (2006.01)
*H01M 8/10* (2006.01)

(52) U.S. Cl. ......... 429/514; 429/513; 429/483; 429/535

(58) Field of Classification Search .................. 429/514, 429/513, 512, 456, 457, 458, 460, 508, 479, 429/535, 483
See application file for complete search history.

(56) References Cited

U.S. PATENT DOCUMENTS
2002/0102453 A1    8/2002  Suenaga et al.
2009/0004546 A9 *  1/2009  Sasahara et al. ................. 429/39

FOREIGN PATENT DOCUMENTS
| JP | 2003-272656 A | 9/2003 |
| JP | 2004-103296 A | 4/2004 |
| JP | 2005-005137 A | 1/2005 |
| JP | 2005-108524 A | 4/2005 |
| JP | 2005-235739 A | 9/2005 |
| JP | 2005-268184 A | 9/2005 |
| JP | 2006-236957 A | 9/2006 |
| JP | 2007-048521 A | 2/2007 |

* cited by examiner

Primary Examiner — Raymond Alejandro
(74) Attorney, Agent, or Firm — Kenyon & Kenyon LLP

(57) ABSTRACT

A plate member for a fuel cell is provided. The plate member for the fuel cell may be laminated together with a membrane-electrode assembly to constitute a fuel cell having cells and may be provided with a channel forming portion which forms a fluid channel to supply and discharge a fluid to/from the membrane-electrode assembly and/or the cells. The plate member for the fuel cell includes a first covering portion which covers the channel forming portion, and a second covering portion which covers an edge of the first covering portion together with a portion around the edge of the first covering portion.

9 Claims, 6 Drawing Sheets

US 8,137,865 B2

PLATE MEMBER FOR FUEL CELL, MANUFACTURING METHOD OF THE PLATE MEMBER, AND FUEL CELL

This is a 371 national phase application of PCT/JP2007/067342 filed 30 Aug. 2007, which claims priority to Japanese Patent Application No. 2006-267962 filed 29 Sep. 2006, the contents of which are incorporated herein by reference.

TECHNICAL FIELD

The present invention relates to a plate member for a fuel cell, a manufacturing method of the plate member, and a fuel cell.

BACKGROUND ART

As a fuel cell, a constitution is suggested in which collector plates, insulating plates and end plates are laminated on opposite sides of a stack (a laminate) constituted of a plurality of layers of cells (unitary cells) each formed by holding a membrane-electrode assembly between plate-like separators on the opposite sides. In such a fuel cell, when a fuel gas and an oxidizing gas are supplied from the outside to the membrane-electrode assemblies of the cells, a power is generated in the cells owing to an electrochemical reaction to discharge a surplus gas, a water vapor, produced water and the like from the cells. Furthermore, a heat medium such as cooling water is supplied and discharged between the cells.

A plate member such as the separator, the collector plate, the insulating plate and the end plate constituting the fuel cell is provided with manifolds for supplying and discharging fluids so that the manifolds extend through the members along a laminating direction. Fluids such as a gas and cooling water are supplied and discharged via the manifolds. Both front and back surfaces of the separators are provided with a large number of channels crossing the laminating direction at right angles, in addition to through holes for the manifolds. The channel of the separator provided on a cell inner side is a channel to supply or discharge the fuel gas and the oxidizing gas to or from the membrane-electrode assembly, and the channel of the separator provided on a cell outer side is a channel to supply or discharge a heat medium such as the cooling water between the adjacent cells.

A plate member such as the separator and the end plate is constituted of a metal material such as stainless steel or a composite material such as FRP in which deterioration such as corrosion is not easily generated, even when the material comes in contact with the fluid. When the plate member is brought into direct contact with fluids such as the fuel gas, the oxidizing gas and the heat medium for a long period, deterioration such as the corrosion occurs. Therefore, at present, a technology to cover a contact portion between each member and each fluid with a resin coating film has been suggested. Furthermore, in recent years, a technology to cover inner wall surfaces of the through holes for the manifolds with gaskets is suggested (e.g., see Japanese Patent Application Laid-Open No. 2005-108524).

DISCLOSURE OF THE INVENTION

However, when a part of the plate member is covered with a resin coating film or the like, an edge is formed around the coating film. Moreover, an edge of the resin coating film is easily formed on the inner wall surface of a through hole for a manifold and a portion where the resin coating film lacks. In a case where such an edge is present in a portion which comes in contact with a fluid, a portion around the edge easily deteriorates. Furthermore, the fluid sometimes invades a backside of the resin coating film from the edge to deteriorate the film. Even in a case where a gasket or the like is attached, when an edge of the gasket is disposed in a portion brought into contact with the fluid, a similar phenomenon easily occurs.

The present invention has been developed in view of such a situation, and an object thereof is to provide a plate member for a fuel cell in which deterioration due to a fluid can highly be prevented.

To achieve the object, according to the present invention, there is provided a plate member for a fuel cell which is laminated together with a membrane-electrode assembly to constitute one fuel cell or a laminate including a plurality of fuel cells and is provided with a channel forming portion which forms a fluid channel to supply and discharge a fluid to/from the membrane-electrode assembly and/or the fuel cells, the member comprising: a first covering portion which covers the channel forming portion; and a second covering portion which covers an edge of the first covering portion together with a portion around the edge of the first covering portion.

When such a constitution is employed, the edge of the first covering portion to cover the channel forming portion together with the portion around the edge of the first covering portion is covered with the second covering portion. Therefore, the edge of the first covering portion which easily deteriorates when coming in contact with the fluid, and a periphery of the edge are not easily brought into contact with the fluid, so that the deterioration of the edge of the first covering portion formed on the channel forming portion can highly be prevented.

In the plate member for the fuel cell, the second covering portion can cover a region surrounded with the edge of the first covering portion.

In this case, a region (the region surrounded with the edge of the first covering portion) of the channel forming portion which is not covered with the first covering portion can easily be covered with the second covering portion, so that the deterioration of the channel forming portion due to the fluid can highly be prevented.

Moreover, in the plate member for the fuel cell, the channel forming portion having a through hole for a manifold is employed, and the second covering portion which continuously covers a portion around the through hole for the manifold of the channel forming portion and an inner wall surface of the through hole for the manifold can be employed.

In this case, the inner wall surface of the through hole for the manifold which extends in a direction different from a direction of both the surfaces of the plate member and which is therefore not uniformly or easily covered with the first covering portion can more securely be covered with the second covering portion.

Moreover, in the plate member for the fuel cell, the second covering portion including an attachment sheet can be employed.

In this case, any unevenness is not generated in covering, so that the edge of the first covering portion can securely be covered, and a covering operation can be facilitated.

Moreover, in the plate member for the fuel cell, in a case where the plate member includes an energizing portion adjacent to the channel forming portion, the second covering portion which has conductivity and which continuously covers the portion around the edge of the first covering portion and the energizing portion can be employed. The second covering portion preferably has conductivity and/or corrosion resistance higher than that of the energizing portion.

In this case, the second covering portion has the conductivity, so that the energizing portion does not easily disturb the conductivity of the energizing portion, even when the energizing portion is covered with the second covering portion. Therefore, the energizing portion can be covered with the second covering portion, so that a boundary region between the energizing portion and the first covering portion can securely be covered with the second covering portion. In addition, a covering region of the second covering portion on the side of the energizing portion does not have to be defined, so that the covering operation can be facilitated.

Moreover, a pair of plate members for the fuel cell are arranged so as to hold the membrane-electrode assembly therebetween, whereby the plate members can function as separators constituting the fuel cell.

In this case, it is possible to highly prevent deterioration due to the fluid of the separators having a broad region brought into contact with the fluid to be supplied to and discharged from the membrane-electrode assembly and the fluid to be supplied to and discharged from the fuel cells.

Furthermore, a fuel cell according to the present invention comprises a membrane-electrode assembly and the plate member for the fuel cell.

When such a constitution is employed, deterioration of the plate member for the fuel cell due to a fluid can highly be prevented, so that the fuel cell having excellent durability is obtained.

In addition, a manufacturing method according to the present invention is a method for manufacturing a plate member for a fuel cell which is laminated together with a membrane-electrode assembly to constitute one fuel cell or a laminate including a plurality of fuel cells and is provided with a channel forming portion which forms a fluid channel to supply and discharge a fluid to/from the membrane-electrode assembly and/or the fuel cells, the method comprising: a first step of covering the channel forming portion with a first covering portion; and a second step of covering, with a second covering portion, an edge of the first covering portion together with a portion around the edge of the first covering portion after the first step.

According to such a manufacturing method, the edge of the first covering portion is formed, and then this edge together with the portion around the edge of the first covering portion is covered with the second covering portion, so that the plate member for the fuel cell having excellent durability can be formed by a simple method.

According to the present invention, there can be provided the plate member for the fuel cell which can highly prevent the deterioration due to the fluid.

BEST MODE FOR CARRYING OUT THE INVENTION

First Embodiment

A first embodiment of the present invention will hereinafter be described with reference to FIGS. 1 to 5B.

Figure 1:
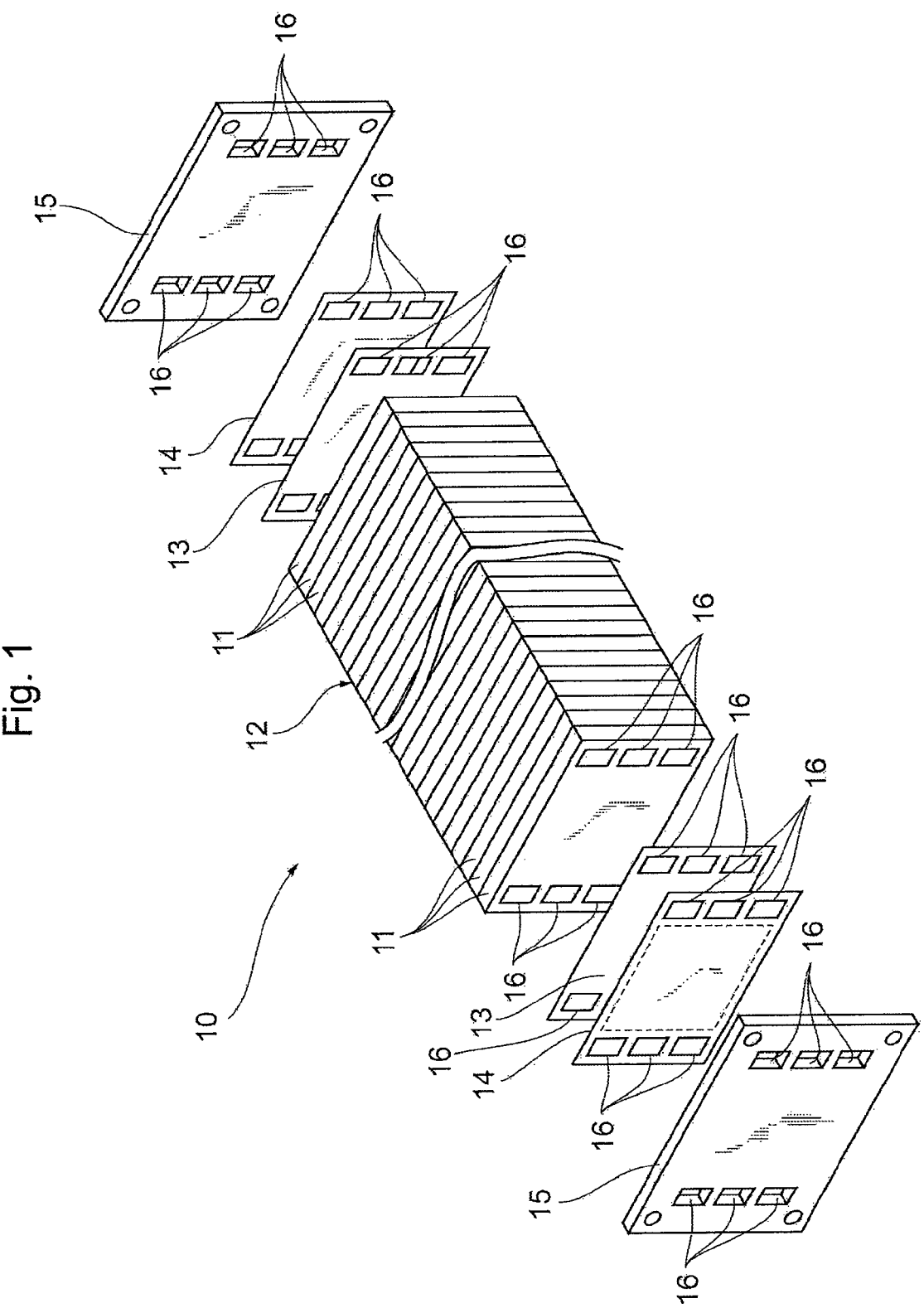
FIG. 1 is a perspective view of a fuel cell according to a first embodiment of the present invention.

First, a constitution of a fuel cell 10 according to the present embodiment will be described. As shown in FIG. 1, the fuel cell 10 has a stack 12 in which a large number of cells 11 to generate a power owing to an electrochemical reaction are laminated, and has a constitution in which collector plates 13, insulating plates 14 and end plates 15 are laminated and integrated on opposite ends in a laminating direction. The stack 12 and the plates 13, 14 and 15 are provided with three sets of manifolds 16 for supplying and discharging a fuel gas, an oxidizing gas and cooling water so that the manifolds extend through the stack and the plates in the laminating direction. The cells 11 correspond to one embodiment of one fuel cell in the present invention, and the stack 12 corresponds to one embodiment of a laminate in the present invention.

Figure 2:
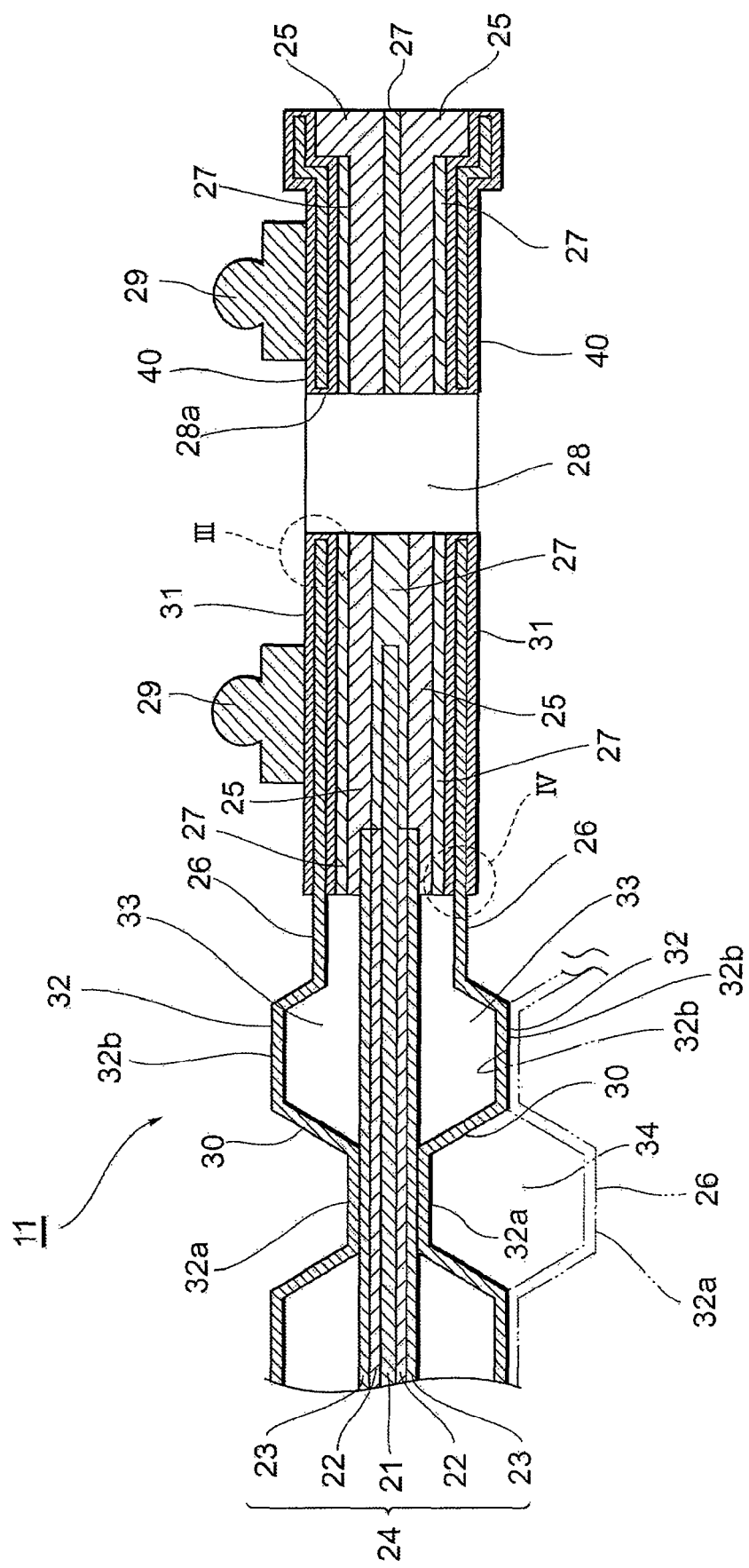
FIG. 2 is a partially sectional view of cells of the fuel cell shown in FIG. 1.

As shown in FIG. 2, each cell 11 includes an MEA 24 as a membrane-electrode assembly in which electrodes 22 are arranged on opposite sides of a polymer electrolyte film 21, and diffusion layers 23 are arranged outside the electrodes 22, and has a constitution in which a peripheral edge portion of the MEA 24 is held between a pair of resin frames 25 and in which the MEA 24 and the resin frames 25 are held between a pair of separators 26 according to one embodiment of plate members for a fuel cell of the present invention.

On the side of the peripheral edge portion of the cell 11, the MEA 24, the resin frames 25 and the separators 26 are bonded to one another in a liquid-tight manner via adhesive layers 27. Further on the side of the peripheral edge portion of the cell 11, a through hole 28 for a manifold is provided so as to extend through the resin frames 25 and the separators 26, thereby constituting each manifold 16. Seal members 29 are attached to the surface of the separator 26 around one opening 28a of the through hole 28 for the manifold so as to surround the opening 28a, and a seal property of the manifold 16 is secured between the cells 11 adjacent to each other.

The separators 26 constituting the cell 11 are constituted of a press formed article of a metal plate of stainless steel or the like, and include power generating regions 30 as energizing portions which hold the MEA 24 therebetween, and channel forming portions 31 provided on peripheral edge sides adjacent to the power generating regions 30. Concavo-convex portions 32 formed in a large number of streaks are provided over substantially the whole surfaces of the power generating regions 30. The channel forming portions 31 are provided with the through hole 28 for the manifold.

On the surface of the concavo-convex portion 32 of the power generating region 30 of the separator 26 on the side of the MEA 24, a vertex of a convex portion 32a protruding toward the MEA 24 abuts on the MEA 24, and a continuous gas channel 33 is formed between a concave portion 32*b* disposed away from the MEA 24 and the MEA 24. On the other hand, a bottom portion of the concave portion 32*b* abuts on the surface of the concavo-convex portion on a side opposite to the MEA 24 so that the concave portion faces a concave portion 32*b* of a separator 26 of the adjacent cell 11, and a continuous cooling water channel 34 is formed between the concavo-convex portion and a convex portion 32*a* of the adjacent separator 26. The MEA 24 abuts on the vertex of the convex portion 32*a*, and is electrically connected thereto, and the MEA also abuts on the concave portion 32*b* of the separator 26 of the adjacent cell 11, and is electrically connected thereto. Moreover, as shown in FIG. 4, both the whole surfaces (the surface on the MEA 24 side and the surface on the side opposite to the MEA 24) of the power generating region 30 are provided with plated metals 26*a* in order to reduce contact resistances of the surfaces, respectively.

Figure 3:
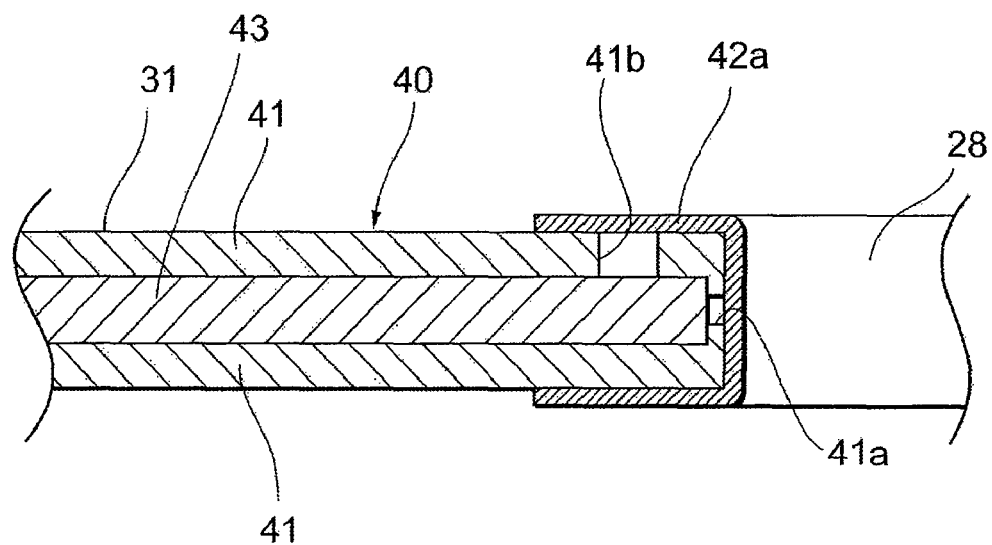
FIG. 3 is an enlarged sectional view of a portion (a part III of FIG. 2) around a through hole for a manifold of a separator according to the first embodiment of the present invention.

On the other hand, as shown in FIG. 2, the surface of the channel forming portion 31 of the separator 26 on the MEA 24 side, and the surface of the channel forming portion on the side opposite to the MEA 24 are covered with covering portions 40 which are stable against the fuel gas, the oxidizing gas and a water content. As shown in FIGS. 3, 4 and 5A, the covering portion 40 includes a first covering portion 41 which comes in contact with the surface of a base material 43 constituted of a metal plate to cover the surface, and second covering portions 42*a*, 42*b* which come in contact with outer surfaces of the first covering portion 41 to cover the outer surfaces.

Figure 5A:
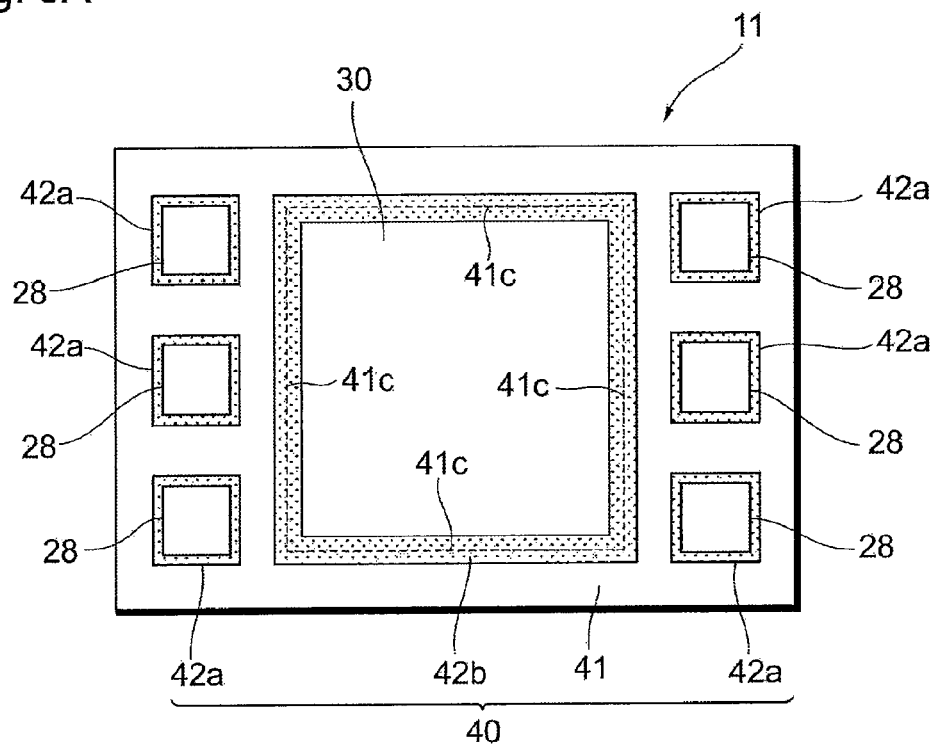
FIG. 5A is a top plan view of a cell of the fuel cell shown in FIG. 1.
Figure 5B:
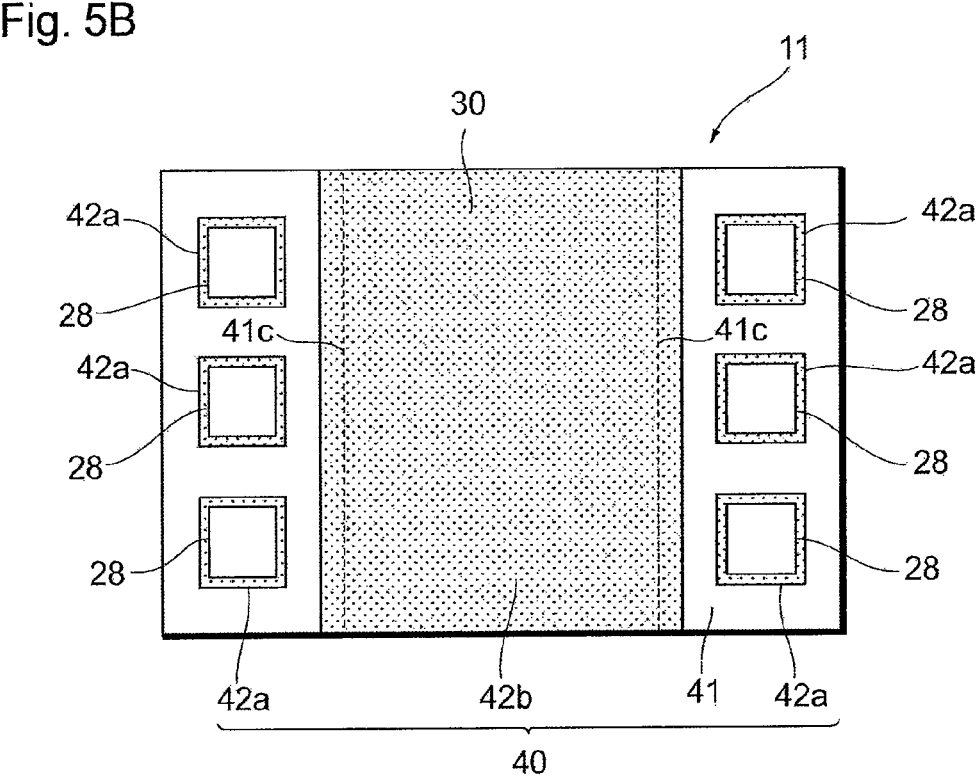
FIG. 5B is a top plan view of a modification of the cell shown in FIG. 5A.

As the first covering portion 41, any means for usual use that comes in contact with the base material 43 of the separator 26 for the fuel cell to cover the material may be employed. Examples of the means include a resin coating film such as a paint film or an electrodeposited film and any type of surface treatment layer such as a plating layer. A member separate from the base material 43, for example, a seal material formed of an elastic material or an attachment sheet may be used. When the plating layer is used, the base material may be plated with a metal continuously from the power generating region 30. In the present embodiment, as shown in FIG. 5A, the first covering portion 41 constituted of a resin coating film to cover the surface of the whole periphery of the separator 26 is employed. It is to be noted that as shown in FIG. 5B, the first covering portion 41 may be provided so as to cover the surfaces of both end portions (portions provided with the through holes 28 for the manifolds) of the separator 26.

Figure 4:
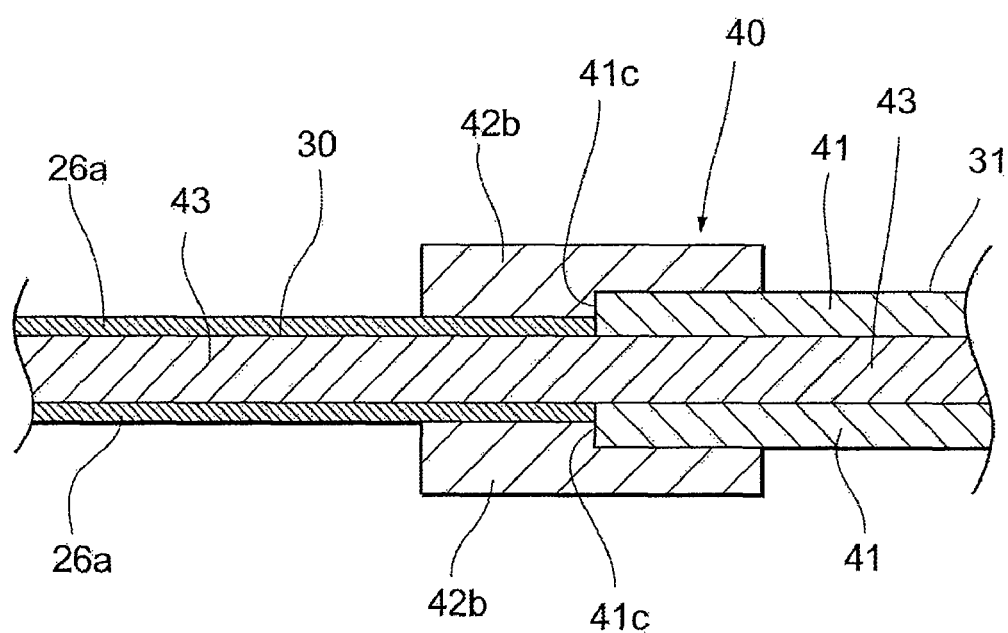
FIG. 4 is an enlarged sectional view of a portion (a part IV of FIG. 2) around an edge of a covering portion of the separator on the side of a power generating region according to the first embodiment of the present invention.

In the first covering portion 41, as shown in FIGS. 3 and 4, edges 41*a*, 41*b* and 41*c* of coating films are formed on portions of the first covering portion which come in contact with the fuel gas, the oxidizing gas or the cooling water to be supplied to and discharged from the fuel cell 10. For example, in the through hole 28 for the manifold or the like, both the surfaces of the base material 43 provided with the first covering portion 41 extend in a direction different from that of the inner wall surface of the base material, so that unevenness and lack easily occur in the resin coating film. As shown in FIG. 3, the inner wall surface is provided with the edge 41*a* of the first covering portion 41 owing to the lack of the resin coating film. Moreover, a plate surface of the base material 43 is provided with the edge 41*b* owing to lack of a coating film during formation, subsequent damage or the like. Furthermore, as shown in FIG. 4, the edge 41*c* constituting a boundary of the first covering portion 41 is formed on the side of the power generating region 30. When the edges 41*a*, 41*b* and 41*c* of the first covering portion 41 are arranged so as to be exposed to the fluid, the fluid enters from the edges 41*a*, 41*b* and 41*c* to easily come in contact with the surface of the base material 43. Furthermore, the fluid easily invades between the edges 41*a*, 41*b* and 41*c* and the base material 43. Therefore, in the present embodiment, these edges 41*a*, 41*b* and 41*c* together with portions around the edges of the first covering portion 41 are covered with the second covering portions 42*a*, 42*b*.

As the second covering portions 42*a*, 42*b*, a resin coating film such as the paint film or the electrodeposited film, a formed member such as the attachment sheet, a sealant such as an adhesive or the like may be used. As the second covering portions 42*a*, 42*b*, portions which are stable against fluids such as the fuel gas and the oxidizing gas to be supplied to or discharged from the fuel cell 10, the water content included in each gas and the cooling water are employed. In particular, it is preferable that the second covering portions 42*a*, 42*b* have an acid resistance higher than that of the base material 43 of the separator 26, and are constituted of a material which does not easily pass a liquid such as formed water. Moreover, it is preferable that the second covering portions 42*a*, 42*b* can come in close contact with the first covering portion 41 with a sufficient bond strength, and can come in close contact with the base material 43 or a surface layer of the base material 43, for example, the plated metal 26*a* with a bond strength equal to or higher than that of the first covering portion 41. As the paint film, a thermoplastic resin such as an acrylic resin, a polyimide resin, a polyester resin or an olefin resin, or any type of thermosetting resin such as an epoxy modified silicone resin may be used. As the electrodeposited film, an epoxy resin, an acrylic resin, a polyimide resin, an urethane resin, a polyamide resin or the like may be used. As the attachment sheet, an insulator sheet may be used in which one surface of a sheet-like formed member made of any type of thermoplastic or thermosetting resin is provided with an adhesive layer made of a silicone resin or an acrylic resin. In addition, a carbon-containing conductor sheet may be used.

When the second covering portions 42*a*, 42*b* are arranged on the power generating region 30 side, the portions are preferably constituted of a material having conductivity, and a resin coating film having the conductivity is preferable. This is because the film does not easily disturb the conductivity of the power generating region 30. As the resin coating film having the conductivity, a conductive resin, a carbon-containing resin or the like may be used. In particular, the portions are preferably constituted of a material having conductivity higher than that of the power generating region 30 and having a corrosion resistance.

In the present embodiment, as shown in FIG. 3, the inner wall surface of the through hole 28 for the manifold is provided with the edge 41*a* of the first covering portion 41, and the base material 43 protrudes from the first covering portion 41 in a region surrounded with the edges 41*a* of the first covering portions 41 which cover both the surfaces of the base material 43. The one surface of the base material 43 around the through hole 28 for the manifold is provided with the edge 41*b* of the first covering portion 41, and the base material 43 protrudes from the first covering portion 41 in a minute region surrounded with the edges 41*b*. Therefore, in the present embodiment, as shown in FIG. 3, the attachment sheet is employed as the second covering portion 42*a*, and continuously covers the first covering portions 41 formed on both the surfaces of the base material 43 on opposite ends of the through hole 28 for the manifold and the inner wall surface of the through hole 28 for the manifold, whereby the edge 41*a* of the first covering portion 41 on the inner wall surface of the through hole 28 for the manifold, the region surrounded with the edge 41*a*, the edge 41*b* of the first covering portion 41 on the side of the one surface of the first covering portion, and the region surrounded with the edge 41b are blocked. In the present embodiment, as shown in FIG. 5, all peripheries of the inner wall surfaces of the through holes 28 for the manifolds are covered with the second covering portions 42a.

Moreover, in the present embodiment, as shown in FIG. 4, the first covering portions 41 on the power generating region 30 side are provided with the edges 41c, and the edges 41c of the first covering portions 41 are arranged adjacent to the plated metals 26a of the power generating region 30. Therefore, in the present embodiment, as shown in FIG. 4, a resin coating film having conductivity is used as the second covering portions 42b, and the edges 41c of the first covering portions 41, portions around the edges of the first covering portions 41 and a portion around an edge of the power generating region 30 are continuously covered with the second covering portions 42b. In the present embodiment, as shown in FIG. 5A, the second covering portion 42b is provided in the form of a strip along the edges 41c of the first covering portion 41. It is to be noted that as shown in FIG. 5B, the second covering portion 42b may be provided so as to cover both the edges 41c of the first covering portion 41 and the whole power generating region 30.

Next, a manufacturing method of the separator 26 and the fuel cell 10 according to the present embodiment will be described.

First, a metal plate is press-formed to form the concavo-convex portion 32 in a position corresponding to the power generating region 30, and the through holes 28 for the manifolds are also formed to prepare the base material 43 having a predetermined shape (a base material preparation step). Subsequently, predetermined positions of both the front and back surfaces of the resultant base material 43 corresponding to the power generating region 30 are plated with metals (a plating step), and a portion corresponding to the channel forming portion 31 adjacent to the power generating region 30 is coated with a resin for forming a resin coating film to form the first covering portion 41 (a first covering portion forming step). The first covering portion forming step corresponds to a first step of the present invention.

The first covering portion 41 is formed through the first covering portion forming step, and then an attachment sheet is attached so as to continuously cover the first covering portions 41 of plate surfaces on the opposite ends of the through hole 28 for the manifold and the inner wall surface of the through hole 28 for the manifold, to form the second covering portion 42a, whereby the edge 41a of the first covering portion 41 and the region surrounded with the edges 41a, 41b are covered. The edge 41c of the first covering portion 41 on the power generating region 30 side and a portion around the edge are coated with a conductive resin to form the second covering portion 42b, whereby the edge 41c of the first covering portion 41 is covered (a second covering portion coating step). The second covering portion coating step corresponds to a second step of the present invention. Through the above step group, the manufacturing of the separator 26 ends.

It is to be noted that the separators 26 manufactured through the above step group are laminated on a pair of resin frames which hold the MEA 24 therebetween, and bonded via the adhesive layers 27, whereby the cell 11 can be manufactured (a cell forming step). Furthermore, a large number of cells 11 are laminated to constitute the stack 12. On the opposite ends of this stack 12, the collector plates 13, the insulating plates 14 and the end plates 15 are laminated and fixed, whereby the fuel cell 10 using the separators 26 of the present embodiment can be manufactured (a fuel cell assembly step).

Next, a function and an effect of the fuel cell 10 provided with the separators 26 according to the present embodiment will be described.

In the fuel cell 10 provided with the separators 26 according to the present embodiment described above, during use, the cooling water is circulated between the adjacent cells 11 of a large number of cells 11 from the manifolds 16 for supplying and discharging the cooling water to adjust a temperature, whereas the fuel gas and the oxidizing gas are supplied to the MEA 24 of each cell 11 from the manifolds 16 for supplying the gases. In consequence, a power is generated in each cell 11 owing to an electrochemical reaction, and a surplus gas, the formed water and the like are discharged from the MEA 24 via the manifolds 16 for discharging the gases.

In this case, in each separator 26, the edges 41a, 41b and 41c of the first covering portion 41 to cover the channel forming portion 31 together with the first covering portion 41 around the edges are covered with the second covering portions 42a, 42b, so that the edges 41a, 41b and 41c of the first covering portion 41 and portions around the edges cannot easily be brought into contact with the fluids. Deterioration of the edges 41a, 41b and 41c of the first covering portion 41 formed on the channel forming portion 31 can highly be prevented.

Moreover, regions surrounded with the edges 41a, 41b and 41c of the first covering portion 41 are continuously covered with the second covering portions 42a, 42b, so that a region of the channel forming portion 31 which is not covered with the first covering portion 41 can easily be covered with the second covering portions 42a, 42b, and the deterioration can more highly be prevented.

Furthermore, the channel forming portion 31 of the separator 26 has the through hole 28 for the manifold, and the second covering portion 42a continuously covers the surfaces of the through hole 28 for the manifold on the opposite ends and the inner wall surface of the through hole 28 for the manifold, so that the inner wall surface of the through hole 28 for the manifold can securely be covered with the second covering portion 42a. Then, the second covering portion 42a which covers the edge 41a of the first covering portion 41 is constituted of the attachment sheet, so that any unevenness is not easily generated in covering, and the edge 41a of the first covering portion 41 can securely be covered, and a covering operation is facilitated.

Moreover, the power generating region 30 of the separator 26 and the portion around the edge 41c of the first covering portion 41 are covered with the second covering portion 42b having conductivity, so that the second covering portion 42b does not easily disturb the conductivity of the power generating region 30, and the boundary region between the power generating region 30 and the first covering portion 41 can securely be covered with the second covering portion 42b. In this case, the covering region of the second covering portion 42b on the power generating region 30 side does not have to be defined, so that the covering operation is facilitated.

Then, the fuel cell 10 according to the present embodiment is constituted using the above-mentioned separators 26, so that the deterioration of the separators 26 due to the fluids can highly be prevented. As a result, the fuel cell is provided with excellent durability. It is to be noted that in the present embodiment, the present invention is preferably applied to all the separators 26, but the present invention may be applied to at least a part of the separators 26.

Second Embodiment

Figure 6:
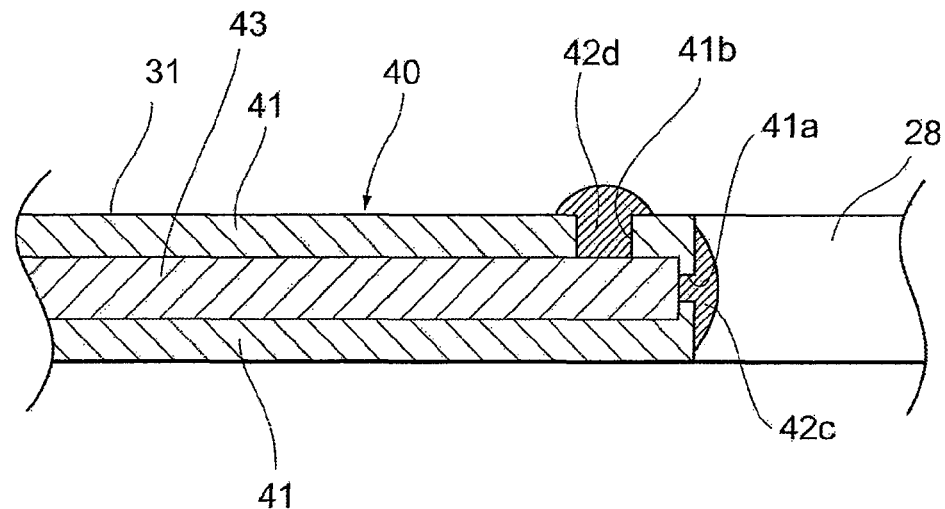
FIG. 6 is an enlarged sectional view of a portion around a through hole for a manifold of a separator according to a second embodiment of the present invention.

Next, a separator according to a second embodiment of the present invention will be described with reference to FIG. 6. In the separator according to the present embodiment, the edges 41a, 41b of the first covering portions 41 according to the first embodiment are covered with second covering portions 42c, 42d different from those of the first embodiment. The other constitution is substantially the same as that of the first embodiment.

Each of the second covering portions 42c, 42d of the present embodiment is a filling material formed of an adhesive. The second covering portion 42c covers the edge 41a of the first covering portion 41 on an inner wall surface of a through hole 28 for a manifold and a region surrounded with the edge 41a, and the second covering portion 42d covers the edge 41b of the first covering portion 41 on the side of one surface of a base material 43 and a region surrounded with the edge 41b.

Even in the separator according to the above embodiment, in the same manner as in the first embodiment, deterioration of portions around the edges 41a, 41b formed on the first covering portion 41 due to fluids can highly be prevented. In addition, as compared with the second covering portion 42a constituted of the attachment sheet employed in the first embodiment, the second covering portions 42c, 42d of the present embodiment have satisfactory followability with respect to shapes of the base material 43 and the first covering portion 41, and are easily brought into close contact with the base material 43 and the first covering portion 41.

Third Embodiment

Figure 7:
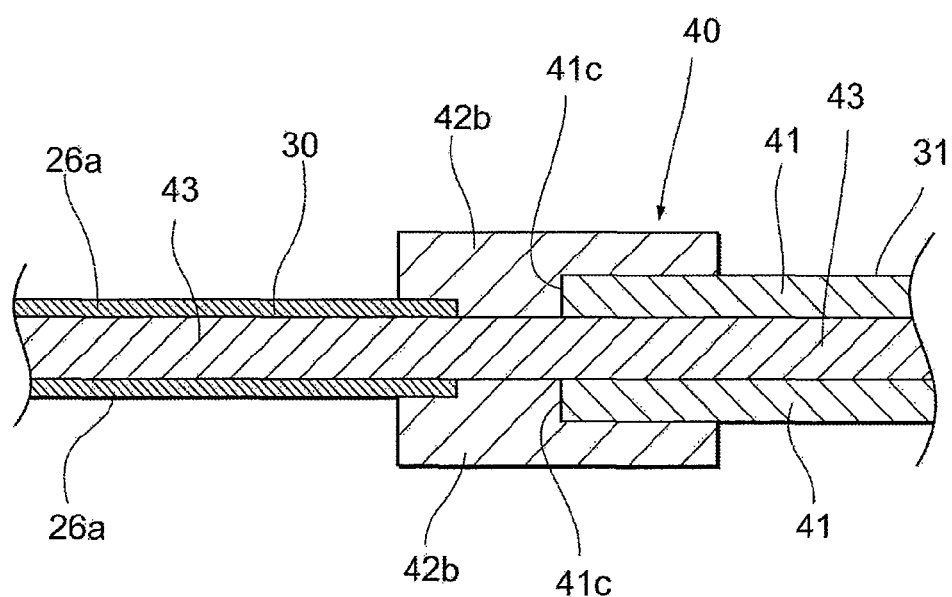
FIG. 7 is an enlarged sectional view of a portion around an edge of a covering portion of a separator on the side of a power generating region according to a third embodiment of the present invention.

Next, a separator according to a third embodiment of the present invention will be described with reference to FIG. 7. In the separator according to the present embodiment, edges 41c of first covering portions 41 on the side of a power generating region 30 are formed away from edges of plated metals 26a, and the other constitution is substantially the same as that of the first embodiment.

Even in such a separator, in the same manner as in the first embodiment, deterioration of portions around the edges 41c formed on the first covering portions 41 due to a fluid can highly be prevented. In addition, the edges 41c of the first covering portions 41 do not have to be precisely positioned during formation, and a boundary portion between the first covering portions 41 and the plated metals 26a can securely be covered. Therefore, the separator can more easily be manufactured with good operability.

Fourth Embodiment

Figure 8:
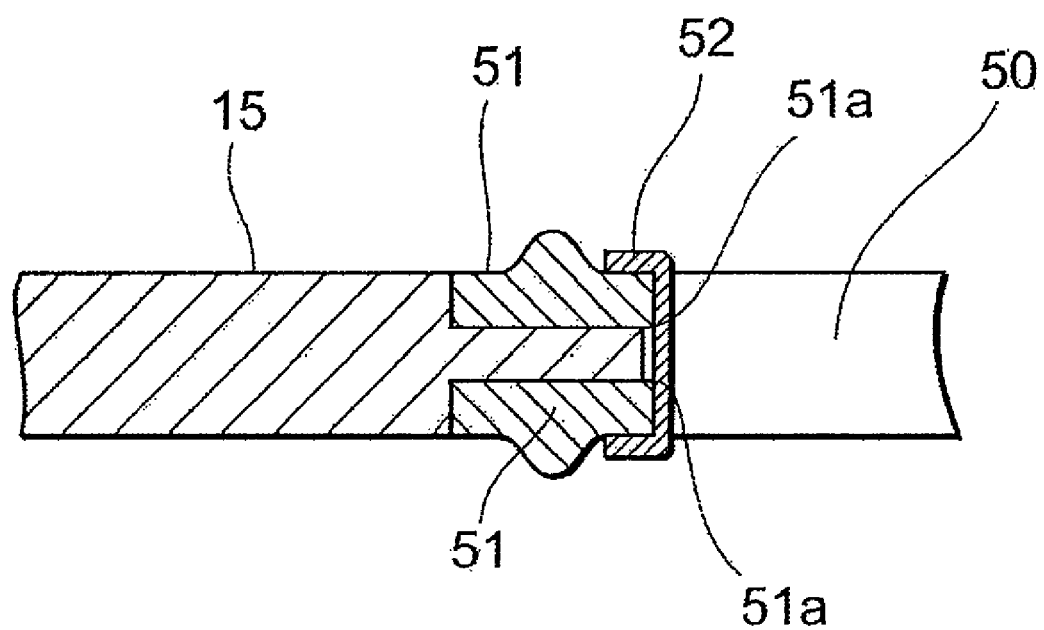
FIG. 8 is an enlarged sectional view around a through hole for a manifold of an end plate according to a fourth embodiment of the present invention.

Next, a fourth embodiment of the present invention will be described with reference to FIG. 8. In the present embodiment, the present invention is applied to a pair of end plates 15 (see FIG. 1) provided on opposite ends of a fuel cell 10. The end plates 15 correspond to one embodiment of plate members for a fuel cell in the present invention.

Each end plate 15 according to the present embodiment is constituted of a metal plate thicker than a separator 26, and both surfaces of the end plate 15 are provided with first covering portions 51 formed of an annular gasket around a manifold through hole 50 constituting a manifold 16. In the present embodiment, inner edges 51a of the first covering portions 51 of both the surfaces are formed on the side of the through hole 50 for the manifold, and both the inner edges 51a are covered with a second covering portion 52 constituted of an attachment sheet. The second covering portion 52 continuously covers the first covering portions 51 of both the surfaces, the inner edges 51a and a region surrounded with the inner edges 51a.

According to the end plate 15 of the above embodiment, an effect similar to that of the separator 26 according to the first embodiment can be obtained. In addition, the first covering portions 51 and the second covering portion 52 are constituted by attaching pre-formed materials (the gasket and the attachment sheet), so that a covering operation is facilitated as compared with a case where a coating film is constituted.

It is to be noted that any of the above embodiments can appropriately be modified within the scope of the present invention. For example, in the above embodiments, an example in which the plate members are made of a metal has been described, but the present invention is not limited to the embodiments, and the present invention is similarly applicable even to plate members constituted of another material such as a glass fiber reinforcing composite material. When the plate members are constituted of the glass fiber reinforcing composite material, deterioration due to dissolution of glass fiber or the like can be prevented.

Moreover, in the above embodiments, an example in which the edges 41a to 41c, 51c of the first covering portions 41, 51 are clearly formed has been described, but such indefinite edges that thicknesses of the first covering portions 41, 51 run short, for example, coating film unevenness may be used.

INDUSTRIAL APPLICABILITY

As described above in the embodiments, the present invention is applicable to separators and end plates. The present invention is similarly applicable to other plate members (collector plates and insulating plates) for a fuel cell.

The invention claimed is:

1. A plate member for a fuel cell which is laminated together with a membrane-electrode assembly to constitute one fuel cell or a laminate including a plurality of fuel cells and is provided with a channel forming portion which forms a fluid channel to supply and discharge a fluid to/from the membrane-electrode assembly and/or the fuel cells, the plate member further comprising:
   top and bottom coating layers to substantially cover the top and bottom surfaces of the channel forming portion respectively;
   a covering coating to cover edges of the top and bottom coating layers together with a portion around the edges of the coating layers; and
   an energizing portion adjacent to the channel forming portion,
   wherein the covering coating has conductivity and/or corrosion resistance higher than that of the energizing portion, and
   wherein the covering coating has conductivity, and continuously covers the portion around the edge of the channel forming portion and the energizing portion.

2. The plate member for the fuel cell according to claim 1, wherein the covering coating covers a region surrounded with edges of the top and bottom coating layers.

3. The plate member for the fuel cell according to claim 1, wherein the channel forming portion has a through hole for a manifold, the covering coating is a coating film, and the coating film continuously covers an inner wall surface of the through hole for the manifold and surrounding top and bottom coating layers.

4. The plate member for the fuel cell according to claim 1, wherein the covering coating includes an attachment sheet.

5. The plate member for the fuel cell according to claim 1, which are a pair of separators, and which are arranged so as to hold the membrane-electrode assembly therebetween, to constitute the fuel cell.

6. A fuel cell comprising:

a membrane-electrode assembly; and the plate member for the fuel cell according to claim 1.

7. A manufacturing method of a plate member for a fuel cell which is laminated together with a membrane-electrode assembly to constitute one fuel cell or a laminate including a plurality of fuel cells and is provided with a channel forming portion which forms a fluid channel to supply and discharge a fluid to/from the membrane-electrode assembly and/or the fuel cells, the method comprising:

a first step of covering the channel forming portion with a top and bottom coating layers to substantially cover its top and bottom surfaces respectively; and a second step of continuously covering, with a covering coating, edges of the top and bottom coating layers together with a portion around the edges of the coating layers, wherein the second step uses the covering coating, which has conductivity, to continuously cover edge of the coating layer, the portion around the edge of the coating layer and an energizing portion adjacent to channel forming portion.

8. The manufacturing method according to claim 7, wherein the covering coating has conductivity and/or corrosion resistance higher than that of the energizing portion.

9. The manufacturing method according to claim 7, the second step continuously covers an inner wall surface of a through hole for a manifold formed in the channel forming portion and surrounding portions of the top and bottom coating layers.

* * * * *

UNITED STATES PATENT AND TRADEMARK OFFICE
CERTIFICATE OF CORRECTION

PATENT NO.         : 8,137,865 B2                                        Page 1 of 1
APPLICATION NO.    : 12/280100
DATED              : March 20, 2012
INVENTOR(S)        : Kazutaka Iizuka It is certified that error appears in the above-identified patent and that said Letters Patent is hereby corrected as shown below:

In the Title Page, Column 1:

Replace "(73) Assignee:   Toyota Jidosha Kabshiki Kaisha," with

--(73) Assignee:   Toyota Jidosha Kabushiki Kaisha,--.

Signed and Sealed this
Twenty-eighth Day of August, 2012

David J. Kappos
*Director of the United States Patent and Trademark Office*